(12) United States Patent
Minoshima (10) Patent No.: US 10,337,909 B2
(45) Date of Patent: Jul. 2, 2019

(54) LOAD MEASURING APPARATUS FOR A WORKING MACHINE

(71) Applicant: HITACHI CONSTRUCTION MACHINERY CO., LTD., Tokyo (JP)

(72) Inventor: Toshikazu Minoshima, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/555,172

(22) PCT Filed: Mar. 10, 2016

(86) PCT No.: PCT/JP2016/057683
§ 371 (c)(1),
(2) Date: Sep. 1, 2017

(87) PCT Pub. No.: WO2016/181697
PCT Pub. Date: Nov. 17, 2016

(65) Prior Publication Data
US 2018/0052038 A1 Feb. 22, 2018

(30) Foreign Application Priority Data
May 13, 2015 (JP) .................................. 2015-098330

(51) Int. Cl.
*G01G 19/12* (2006.01)
*G06F 19/00* (2018.01)
(Continued)

(52) U.S. Cl.
CPC ............... *G01G 19/12* (2013.01); *B60P 1/04* (2013.01); *G01G 19/02* (2013.01); *G01G 19/083* (2013.01); *G01G 19/10* (2013.01)

(58) Field of Classification Search
CPC ..... B60P 1/04; B60G 17/0152; B60G 17/016; B60G 17/00; G01G 19/10; G01G 19/12; G06F 19/00
See application file for complete search history.

(56) References Cited

U.S. PATENT DOCUMENTS 5,391,843 A * 2/1995 Sato ....................... G01G 19/10
177/141
7,431,309 B2 * 10/2008 Kobayashi ......... B60G 17/0152
280/6.159
(Continued)

FOREIGN PATENT DOCUMENTS

CN 101806610 A 8/2010
CN 102353433 A 2/2012
(Continued)

OTHER PUBLICATIONS

International Search Report of PCT/JP2016/057683 dated Jun. 7, 2016.

Primary Examiner — Yuri Kan
(74) Attorney, Agent, or Firm — Mattingly & Malur, PC (57) ABSTRACT

The load measuring apparatus for a working machine includes a front load acquisition unit that acquires a front load applied to front suspension cylinders 18Al, 18Ar, a rear load acquisition unit that acquires a rear load applied to rear suspension cylinders 18Bl, 18Br, a surface resistance detection unit 320 that detects a surface resistance of a travel road for a dump truck 1, an adder 313 that based on the front load acquired by the front load acquisition unit and the rear load acquired by the rear load acquisition unit, computes a total load acting on the suspension cylinders 18Al, 18Ar, 18Bl, 18Br to determine the load of a cargo 14A, and a total load correction unit 321 that corrects the total load, which has (Continued)

been computed by the adder 313, according to the surface resistance detected by the surface resistance detection unit 320.

4 Claims, 7 Drawing Sheets

(51) Int. Cl.
    *G01G 19/10*     (2006.01)
    *B60P 1/04*     (2006.01)
    *G01G 19/02*     (2006.01)
    *G01G 19/08*     (2006.01)

(56) References Cited

U.S. PATENT DOCUMENTS

| | | |
|---|---|---|
| 8,437,982 B2 | 5/2013 | Minoshima et al. |
| 2007/0271018 A1* | 11/2007 | Hofmann ............ B60G 17/0152 701/69 |

FOREIGN PATENT DOCUMENTS

| | | |
|---|---|---|
| CN | 102353433 B | 3/2013 |
| JP | 08-282234 A | 10/1996 |
| JP | 2001-108512 A | 4/2001 |
| JP | 5160468 B2 | 3/2013 |
| JP | 2013-154800 A | 8/2013 |
| JP | 2014-040225 A | 3/2014 |
| WO | 91/17413 A1 | 11/1991 |
| WO | 2014/156903 A1 | 10/2014 |

* cited by examiner

LOAD MEASURING APPARATUS FOR A WORKING MACHINE

TECHNICAL FIELD

This invention relates to a load measuring apparatus for a working machine, which measures the load of a cargo carried on a vessel of the working machine.

BACKGROUND ART

A working machine, such as a dump truck, that hauls, as a cargo, ore, rocks or the like excavated at a mine or the like, as a cargo generally includes a body frame, front wheels and rear wheels rotatably provided on the body frame, a vessel tiltably mounted on the body frame for carrying a cargo, and front suspension cylinders and rear suspension cylinders disposed between the body frame and the front wheels and rear wheels, respectively, for reducing shocks to the vehicle body during traveling. The working machine of such configurations is provided with a load measuring apparatus that measures the load of the cargo carried on the vessel.

As one of conventional technologies on load measuring apparatuses of this type for working machines, a load measuring apparatus is known. This load measuring apparatus is provided with a processing unit, which receives cylinder pressures of front suspension cylinders and rear suspension cylinders from pressure sensors and computes the load of a cargo carried on a vessel (see, for example, Patent Document 1 to be described below).

The load measuring apparatus of the conventional technology includes rear-wheel speed detectors that detect speeds of left and right, rear wheels on a body, a speed difference detector that detects a difference between the speeds from the respective rear-wheel speed detectors, and a final cargo load confirmation device having a final confirmation arithmetic unit that outputs, as a final cargo load, a cargo load computed by the processing unit when the difference between the speeds of the respective rear wheels from the speed difference detector has reached below a preset value or that disables the cargo load, which has been computed by the processing unit, as a final out put of cargo load when the difference between the speeds of the respective rear wheels from the speed difference detector has exceeded the preset value.

PRIOR ART DOCUMENT

Patent Document

Patent Document 1: JP 5160468 B2

DISCLOSURE OF THE INVENTION

Problem to Be Solved by the Invention

When a working machine such as a dump truck travels on a travel road, wheels encounter surface resistance from the surface or the like of the travel road so that not only a drag in the traveling direction of a body but also a drag in an upward direction in which the body floats up act on the wheels. At this time, loads applied to respective front and rear, left and right suspension cylinders, which are disposed between a body frame and the wheels, are unbalanced and become unstable, and as a consequence, an error may arise in a cargo load measured by a load measuring apparatus.

On the other hand, the load measuring apparatus of the conventional technology disclosed in Patent Document 1 tries to make an improvement in the accuracy of measurement of a cargo load by eliminating effects of the balance of loads applied to the respective suspension cylinders in association with longitudinal and lateral inclinations of the body when the working machine travels on a curvilinear route, but any error in the measurement of the cargo load caused by the above-mentioned surface resistance is not taken into account. When the working machine travels on a road surface, which tends to give a relatively large surface resistance, like a road surface on a loose ground such as mud, the balance of loads applied to the respective suspension cylinders, therefore, becomes unstable even if the travel route of the working machine is rectilinear. Accordingly, the loads are distributed to parts other than the suspension cylinders via link mechanisms that form the respective suspension cylinders, leading to a greater error in the measurement of the load of the cargo due to the surface resistance . As a consequence, there is a concern about a possible reduction in the accuracy of measurement of the load of the cargo.

With the foregoing circumstances in view, the present invention has an object thereof the provision of a load measuring apparatus for a working machine, which can provide an improved accuracy in the measurement of the load of a cargo carried on a vessel.

Solution for the Problem

To achieve the above-described object, the present invention provides a load measuring apparatus for a working machine applicable to a working machine, which includes a body frame, front wheels and rear wheels rotatably disposed on the body frame, a vessel tiltably mounted on the body frame for carrying a cargo, and front suspension cylinders and rear suspension cylinders disposed between the body frame and the front wheels and rear wheels, respectively, for reducing shocks to a body during traveling, to measure a load of the cargo carried on the vessel. The load measuring apparatus for a working machine includes a front load acquisition unit that acquires a front load applied to the front suspension cylinders, a rear load acquisition unit that acquires a rear load applied to the rear suspension cylinders, a surface resistance detection unit that detects a surface resistance of a travel road for the working machine, a total load computing unit that based on the front load acquired by the front load acquisition unit and the rear load acquired by the rear load acquisition unit, computes a total load acting on the front suspension cylinders and rear suspension cylinders to determine the load of the cargo, and a total load correction unit that corrects the total load, which has been computed by the total load computing unit, according to the surface resistance detected by the surface resistance detection unit.

Advantageous Effects of the Invention

According to the load measuring apparatus of the present invention for the working machine, an improvement or improvements can be made in the accuracy of measurement of the load of the cargo carried on the vessel. Objects, configurations and effects other than those mentioned above will become apparent from the following description of embodiments.

EMBODIMENTS FOR CARRYING OUT THE INVENTION

Modes for carrying out the load measuring apparatus according to the present invention for the working machine will hereinafter be described based on the drawings.

Based on the drawings, embodiments of the present invention will hereinafter be described in detail. It is to be noted that members having the same function are designated by the same or a relevant characters throughout the drawings for describing the embodiments of the present invention and their repeating description is omitted. Further, in the following embodiments, the description of the same part or a similar part will not be repeated in principle unless specifically needed.

[First Embodiment]

Figure 1:
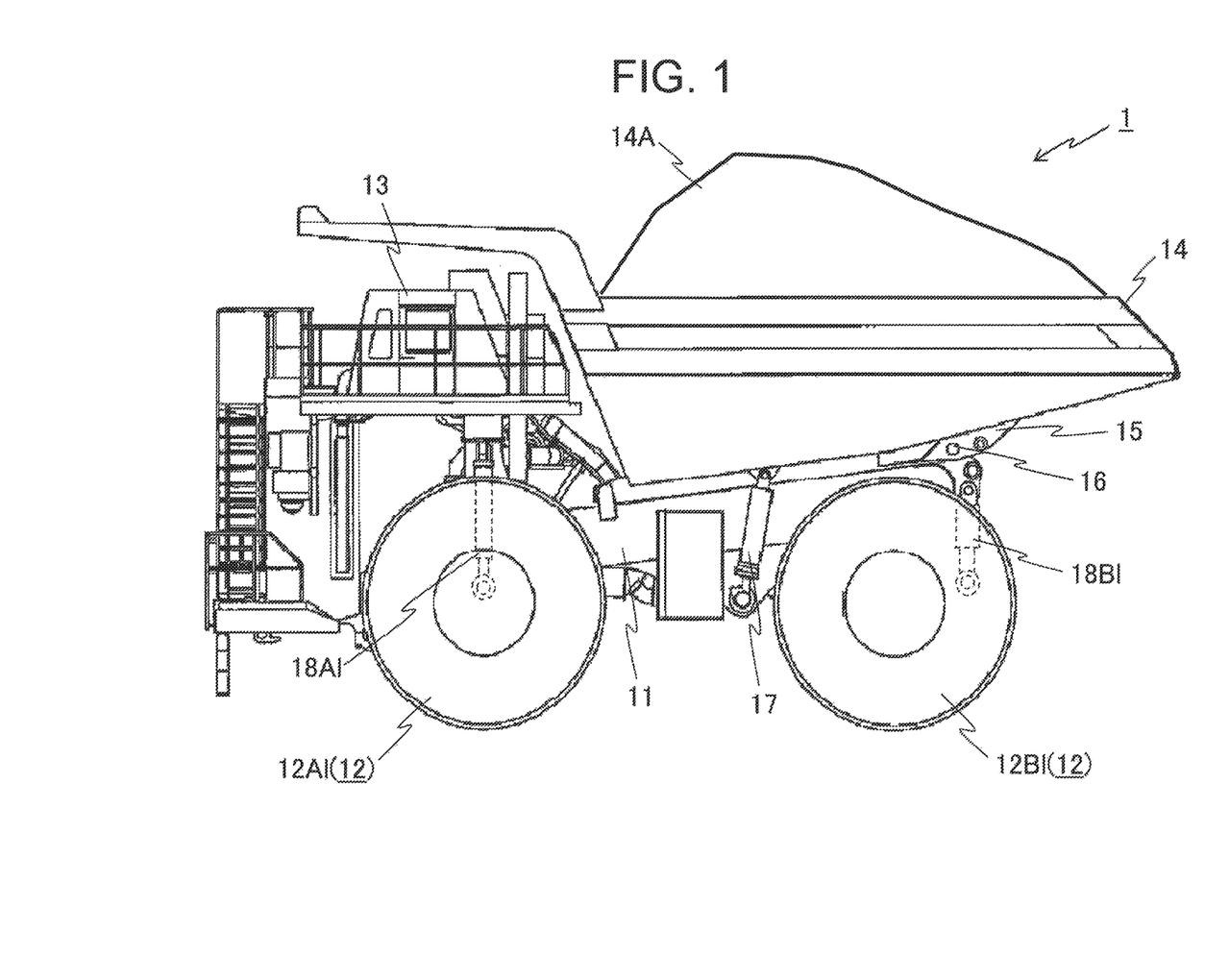
FIG. 1 is an overall view depicting configurations of a dump truck exemplified as an example of the working machine to which a first embodiment of the load measuring apparatus according to the present invention is applied.

As illustrated by way of example in FIG. 1, the first embodiment of the load measuring apparatus according to the present invention is applied to a dump truck 1 that hauls, as a cargo, ore, rocks or the like excavated in a mine or the like. This dump truck 1 is provided with a body frame 11, and wheels 12 rotatably disposed on the body frame 11.

These wheels 12 are provided with, for example, front wheels 12Al, 12Ar disposed on both left and right ends of a front section of the body frame 11, with one front wheel being on each end (only the left front wheel 12Al is depicted in FIG. 1) and rear wheels 12Bl, 12Br rotatably disposed on both left and right ends of a rear section of the body frame 11, with two rear wheels being on each end (only one of the left rear wheels 12Bl is depicted in FIG. 1).

The front wheels 12Al, 12Ar are wheels to be steered based on a steering angle to be inputted via a steering wheel or the like, and also driven wheels driven in accordance with the rear wheels 12Bl, 12Br via the surface of a travel road on which the dump truck 1 travels. On the other hand, the rear wheels 12Bl, 12Br are drive wheels that rotate by converting drive force, which is transmitted from an output shaft of an undepicted engine, into torques.

The dump truck 1 is also provided with an operator's cab 13 provided over the front wheels 12Al, 12Ar and allowing an operator to ride therein, a vessel 14 mounted tiltably relative to the body frame 11 for carrying a cargo 14A such as ore, rocks or the like, a hinge pin 16 disposed on the rear section of the body frame 11 via brackets 15, and hoist cylinders 17 disposed on the body frame 11 at locations forward of the hinge pin 16 and connecting the body frame 11 and the vessel 14 together. On the dump truck 1, a hydraulic pump and a hydraulic oil tank are also mounted although they are not depicted in the drawing. The hydraulic pump supplies pressure oil to the hoist cylinders 17, and the hydraulic oil tank stores hydraulic oil to be supplied to the hydraulic pump.

When the hydraulic pump supplies pressure oil from the hydraulic oil tank to the hoist cylinders 17 to extend the hoist cylinders 17, the vessel 14 is hence hoisted and raised by the hoist cylinders 17 so that the cargo 14A carried on the vessel 14 can be dumped. When the hydraulic pump returns the pressure oil, which has been supplied to the hoist cylinders 17, to the hydraulic oil tank to retract the hoist cylinders 17, on the other hand, the vessel 14 is lowered while being supported by the hoist cylinders 17, so that the cargo 14A can be loaded onto the vessel 14.

Different from a general passenger car such as an automotive vehicle, the dump truck 1 of such configurations as described above in a loaded state with the cargo 14A carried on the vessel 14 changes two-fold or more in vehicle load in comparison with the dump truck 1 in an unloaded state with the cargo 14A not carried on the vessel 14. To avoid any large change in height of the dump truck 1 in the loaded state from the dump truck 1 in the unloaded state, front suspension cylinders 18Al, 18Ar and rear suspension cylinders 18Bl, 18Br which are generally filled with gas and oil are, therefore, mounted in pairs on the dump truck 1. It is to be noted that in FIG. 1, only the left front suspension cylinder 18Al and only the left rear suspension cylinder 18Bl are depicted.

The paired front suspension cylinders 18Al, 18Ar are disposed on left and right sides, respectively, in the lateral direction of the vehicle, are interposed between the body frame 11 and the front wheels 12Al, 12Ar, and have a function to support heavy objects including the body, vessel 14, and the cargo 14A on the vessel 14 and to reduce shocks to the body during traveling. For the respective front suspension cylinders 18Al, 18Ar, an independent suspension system that enables to move the paired, left and right front wheels 12Al, 12Ar independently up and down is adopted, for example. The use of this system can facilitate the front wheels 12Al, 12Ar to follow unevenness formed in the surface of a travel road for the dump truck 1, thereby making it possible to provide the operator in the operator's cab 13 with improved riding comfort.

The paired rear suspension cylinders 18Bl, 18Br are disposed on left and right sides, respectively, in the lateral direction of the vehicle, are interposed between the body frame 11 and the rear wheels 12Bl, 12Br, and have a function to support the heavy objects including the body, vessel 14, and the cargo 14A on the vessel 14 and to reduce shocks to the body during traveling. For the respective rear suspension cylinders 18Bl, 18Br, a rigid axle system that suspends both ends of an axle, which connects the paired, left and right rear wheels 12Bl, 12Br to each other, at opposite ends thereof is adopted, for example. The rigid axle system can provide enhanced strength compared with the independent suspension system, and therefore can stably support the cargo 14A carried on the vessel 14.

Figure 2:
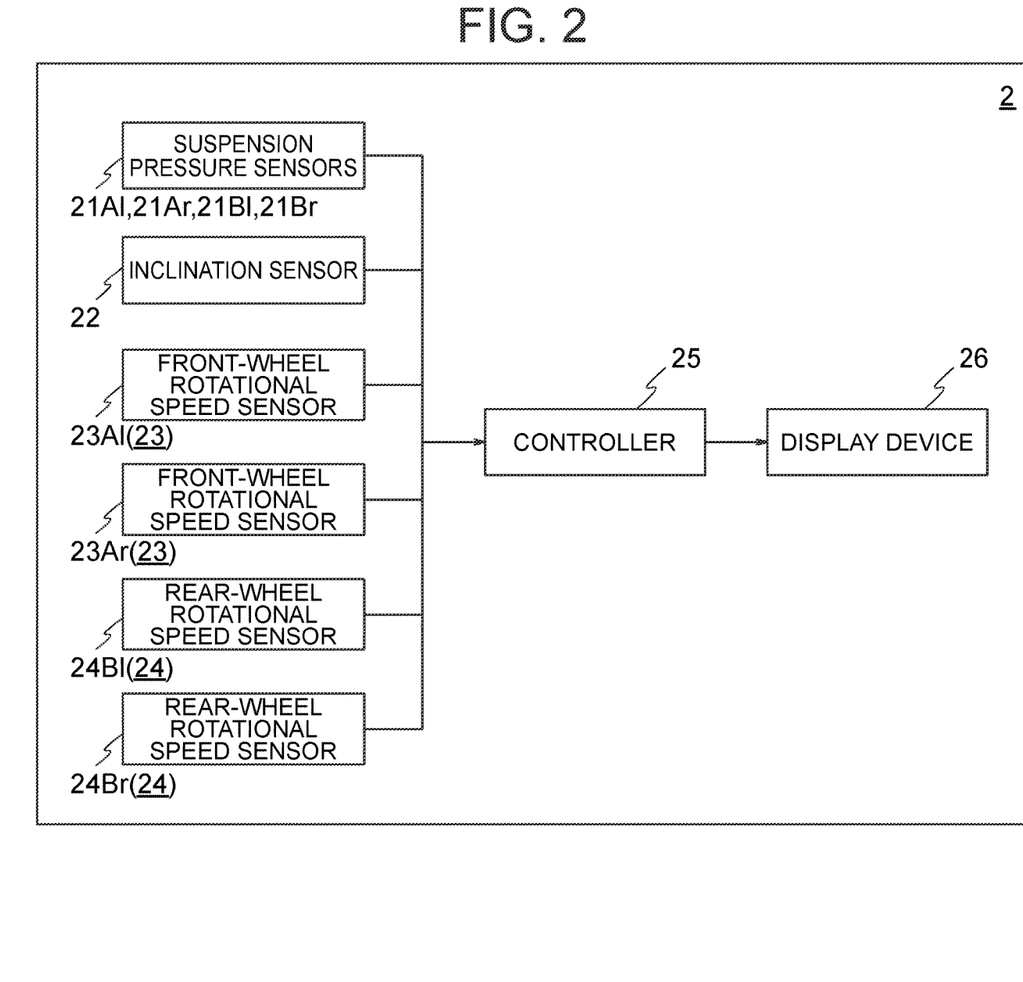
FIG. 2 is a view showing schematic configurations of the load measuring apparatus according to the first embodiment of the present invention.
Figure 3:
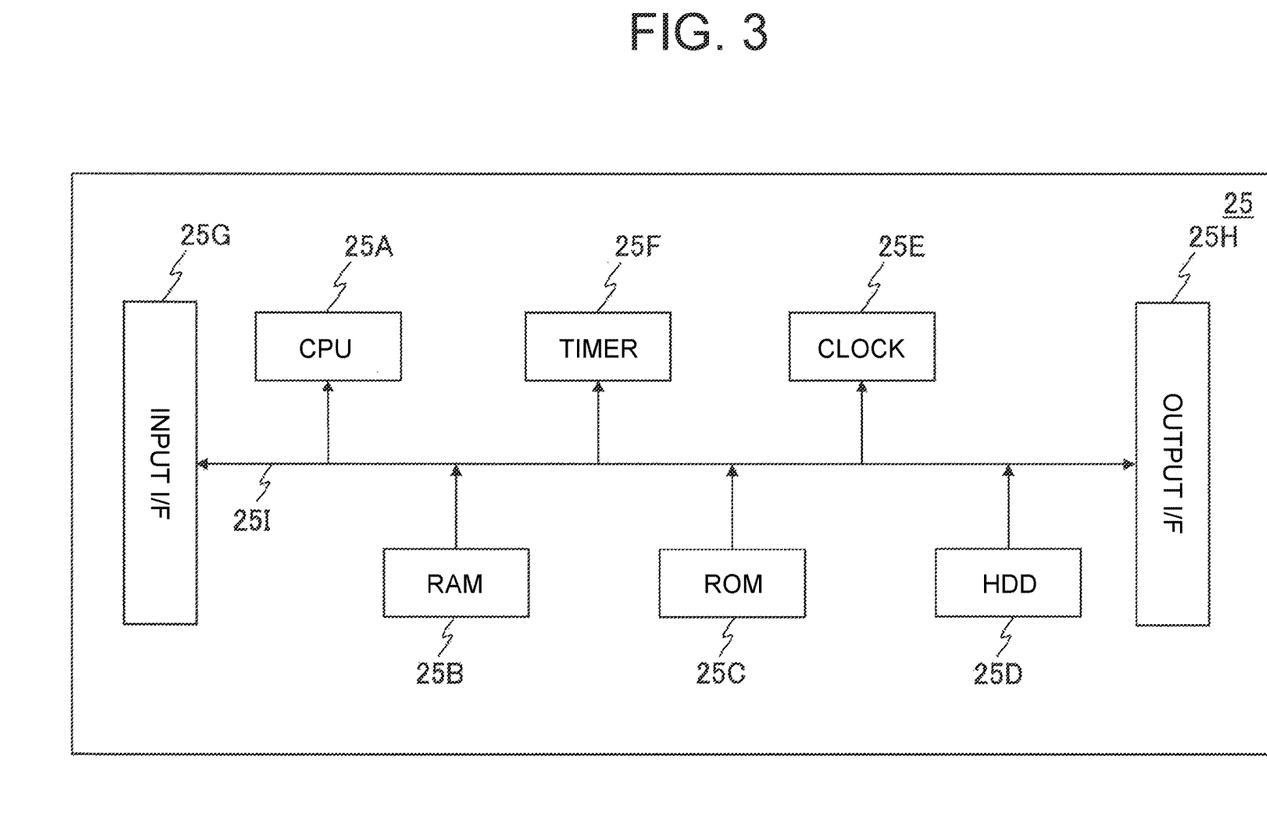
FIG. 3 is a view depicting hardware configurations of a controller shown in FIG. 2.
Figure 4:
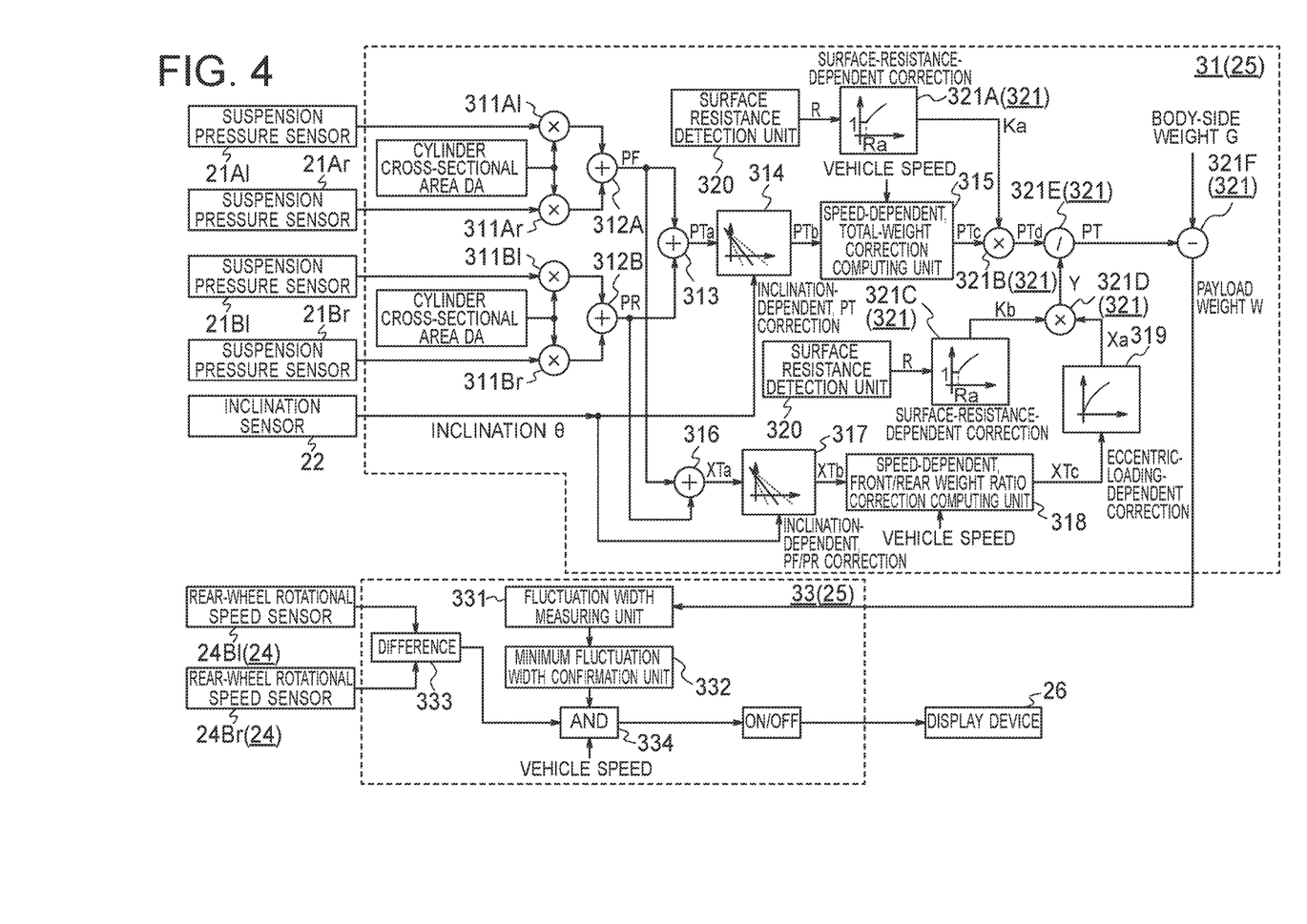
FIG. 4 is a functional block diagram illustrating main functions of the controller depicted in FIG. 3.

The load measuring apparatus according to the first embodiment of the present invention is arranged on the dump truck 1 configured as mentioned above, and serves to measure the load W (see FIG. 4) of the cargo 14A carried on the vessel 14. With reference to FIG. 2 to FIG. 4, a description will hereinafter be made in detail about configurations of this load measuring apparatus.

As shown in FIG. 2, the load measuring apparatus 2 according to the first embodiment of the present invention is provided with suspension pressure sensors 21Al, 21Ar and suspension pressure sensors 21Bl, 21Br. The suspension pressure sensors 21Al, 21Ar are attached to the respective front suspension cylinders 18Al, 18Ar, and detect pressures (hereinafter called "suspension pressures" for the sake of convenience) in the respective front suspension cylinders 18Al, 18Ar, while the suspension pressure sensors 21Bl, 21Br are attached to the respective rear suspension cylinders 18Bl, 18Br, and detect suspension pressures in the respective rear suspension cylinders 18Bl, 18Br.

The load measuring apparatus 2 also includes an inclination sensor 22, a vehicle speed detector 23, a drive-wheel rotational speed detector 24, a controller 25, and a display device 26 such as a liquid crystal display. The inclination sensor 22 is arranged in the operator's cab 13, and detects an inclination θ (see FIG. 4) of the body in the longitudinal direction thereof. The vehicle speed detector 23 detects the speed of the body. The drive-wheel rotational speed detector 24 detects the rotational speed of one of the drive wheels of the wheels 12. The controller 25 receives detection signals inputted from these sensors or detectors 21Al, 21Ar, 21Bl, 21Br, 22-24, and performs processing for controlling operations of the whole body, including processing to measure the load W of the cargo 14A carried on the vessel 14. The display device 26 is arranged in the operator's cab 13, and displays various information, such as the load W of the cargo 14A, processed by the controller 25.

The vehicle speed detector 23 is provided with front-wheel rotational speed sensors 23Al, 23Ar, which are disposed, for example, near the respective front wheels 12Al, 12Ar to detect the rotational speeds of the respective front wheels 12Al, 12Ar. The front-wheel rotational speed sensors 23Al, 23Ar serve to detect the rotational speeds of the driven wheels of the dump truck 1, and therefore can be considered to be those which detect the speed of the body. The drive-wheel rotational speed detector 24 is provided with rear-wheel rotational speed sensors 24Bl, 24Br, which are disposed, for example, near the respective rear wheels 12Bl, 12Br as drive wheels to detect the rotational speeds of the respective rear wheels 12Bl, 12Br.

FIG. 3 is a view depicting hardware configurations of the controller 25.

As depicted by way of example in FIG. 3, the controller 25 includes a central processing unit (CPU) 25A, a random access memory (RAM) 25B, a read only memory (ROM) 25C, a hard disk drive (HDD) 25D, a clock 25E, a timer 25F, an input I/F 25G, an output I/F 25H, and a bus 25I. These CPU 25A, RAM 25B, ROM 25C, HDD 25D, clock 25E, timer 25F, input I/F 25G and output I/F 25H are connected together via the bus 25I to configure the controller 25.

The CPU 25A is an arithmetic unit that performs various computations for measuring the load W of the cargo 14A carried on the vessel 14, and controls the operations of the whole body. The RAM 25B is a storage device formed of a volatile storage medium that permits high-speed reading and writing of information, and is used as a working area upon processing of information by the CPU 25A. The ROM 25C is a storage device formed of a read-only, non-volatile storage medium, and stores a load measuring program as characteristic features of the first embodiment of the present invention. The HDD 25D is a storage device formed of a non-volatile recording medium that permits reading and writing of information, and stores an operating system (OS), various control programs, applications programs, and the like.

These ROM 25C and HDD 25D store the values DA (see FIG. 4) of cross-sectional areas of the individual cylinders of the front suspension cylinders 18Al, 18Ar and rear suspension cylinders 18Bl, 18Br and a body-side load G (see FIG. 4) supported by the front suspension cylinders 18Al, 18Ar and rear suspension cylinders 18Bl, 18Br.

The ROM 25C and HDD 25D also store inclination-dependent correction characteristics A and inclination-dependent correction characteristics B. The inclination-dependent correction characteristics A are used to determine a total load PTa (see FIG. 4), which is acting on the front suspension cylinders 18Al, 18Ar and rear suspension cylinders 18Bl, 18Br, as a total load PTb (FIG. 4) under the assumption of no inclination, based on the inclination θ of the body from the inclination sensor 22. The inclination-dependent correction characteristics B are used to determine a front/rear load ratio XTa, which is a ratio of a front load PF (see FIG. 4) acting on the front suspension cylinders 18Al, 18Ar to a rear load PR (see FIG. 4) acting on the rear suspension cylinders 18Bl, 18Br (XTa=PF/PR), as a front/rear load ratio XTb (see FIG. 4) under the assumption of no inclination, based on the inclination θ of the body from the inclination sensor 22.

The ROM 25C and HDD 25D further store eccentric-dependent loading correction characteristics C indicating correlations (first correlations) between the front/rear load ratio XTa and, as a correction ratio for correcting an error caused by eccentricity of the cargo 14A on the vessel 14, the eccentric-loading-dependent correction ratio Xa (see FIG. 4) for the total load PTa, the eccentric-loading-depending correction ratio Xa being a correction ratio, for example, when the cargo 14A is spread evenly on the vessel 14. The ROM 25C and HDD 25D still further store surface-resistance-dependent correction characteristics D indicating correlations (second correlations) between the surface resistance R (see FIG. 4) of a travel road, on which the dump truck 1 travels, and the total load correction coefficient Ka (see FIG. 4) that is a correction coefficient for correcting an error caused by the surface resistance Ron the total load PTa on the suspension cylinders 18Al, 18Ar, 18Bl, 18Br.

In addition, the ROM 25C and HDD 25D yet further store surface-resistance-dependent correction characteristics E and surface friction characteristics F. The surface-resistance-dependent correction characteristics E indicate correlations (third correlations) between the surface resistance Rand the front/rear load ratio correction coefficient Kb (see FIG. 4) as a correction coefficient for correcting an error caused by the surface resistance R on the front/rear load ratio XTa. The surface friction characteristics F indicate correlations between the slip ratio of the dump truck 1 and the surface friction coefficient for determining the surface resistance R.

The clock 25E is a device that acquires a clock time, and the timer 25F is a device that drives the CPU 25A while referring to the clock time acquired by the clock 25E. The input I/F 25G is an interface, which is connected to external equipment including the suspension pressure sensors 21Al, 21Ar, 21Bl, 21Br, inclination sensor 22, front-wheel rotational speed sensors 23Al, 23Ar and rear-wheel rotational speed sensors 24Bl, 24Br and inputs signals outputted from these external equipment. The output I/F 25H is an interface, which is connected to external output devices including the display device 26 and outputs computation results of the CPU 25A to the external output devices.

In such hardware configurations of the controller 25 as described above, the load measuring program stored in the ROM 25C and HDD 25D or an undepicted recording medium such as an optical disk is read to the RAM 25B, and is allowed to run according to control by the CPU 25A, whereby the load measuring program (software) and the hardware cooperate with each other to configure a functional block that realizes the functions of the controller 25 for measuring the load W of the cargo 14A on the vessel 14.

With reference to FIG. 4, a description will next be made in detail about the functional configurations of the controller 25 on the measurement of the load W of the cargo 14A.

The controller 25 is provided with a cargo load computing device 31 and a final cargo load confirmation device 33. The cargo load computing device 31 computes the load W of the cargo 14A loosely loaded on the vessel 14, and the final cargo load confirmation device 33 confirms the load W of the cargo 14A to be determined finally.

The cargo load computing device 31 includes multipliers 311Al, 311Ar, 311Bl, 311Br, adders 312A, 312B, 313, an inclination-dependent, total load correction computing unit 314, a speed-dependent, total load correction computing unit 315, a divider 316, an inclination-dependent, front/rear load ratio correction computing unit 317, a speed-dependent, front/rear load ratio correction computing unit 318, and an eccentric-loading-dependent, correction ratio computing unit 319.

The multipliers 311Al, 311Ar compute loads acting on the front suspension cylinders 18Al, 18Ar, respectively, by multiplying suspension pressures in the front suspension cylinders 18Al, 18Ar, which have been detected by the suspension pressure sensors 21Al, 21Ar, and the cylinder cross-sectional area DA stored beforehand. The multipliers 311Bl, 311Br compute loads acting on the rear suspension cylinders 18Bl, 18Br, respectively, by multiplying suspension pressures in the rear suspension cylinders 18Bl, 18Br, which have been detected by the suspension pressure sensors 21Bl, 21Br, and the cylinder cross-sectional area DA stored beforehand.

The adder 312A computes the front load PF, which is applied to the front suspension cylinders 18Al, 18Ar, by adding the load on the left front suspension cylinder 18Al computed by the multiplier 311Al and the load on the right front suspension cylinder 18Ar computed by the multiplier 311Ar. Therefore, the suspension pressure sensors 21Al, 21Ar, multipliers 311Al, 311Ar and adder 312A function as a front load acquisition unit that acquires the front load PF applied to the front suspension cylinders 18Al, 18Ar.

The adder 312B computes the rear load PR, which is applied to the rear suspension cylinders 18Bl, 18Br, by adding the load on the left rear suspension cylinder 18Bl computed by the multiplier 311Bl and the load on the right rear suspension cylinder 18Br computed by the multiplier 311Br. Therefore, the suspension pressure sensors 21Bl, 21Br, multipliers 311Bl, 311Br and adder 312B function as a rear load acquisition unit that acquires the rear load PR applied to the rear suspension cylinders 18Bl, 18Br.

The adder 313 computes the total load PTa, which is acting on the front suspension cylinders 18Al, 18Ar and rear suspension cylinders 18Bl, 18Br, by adding the front load PF computed by the adder 312A and the rear load PR computed by the adder 312B. Therefore, the adder 313 functions as a total load computing unit, which computes the total load PTa acting on the front suspension cylinders 18Al, 18Ar and rear suspension cylinders 18Bl, 18Br to determine the load W of the cargo 14A on the vessel 14, based on the front load PF acquired by the front load acquisition unit and the rear load PR acquired by the rear load acquisition unit.

The inclination-dependent, total load correction computing unit 314 computes the total load PTb under the assumption of no body inclination by correcting the total load PTa on the suspension cylinders 18Al, 18Ar, 18Bl, 18Br, which has been computed by the adder 313, based on the inclination θ detected by the inclination sensor 22 and the inclination-dependent correction characteristics A stored beforehand. The speed-dependent, total load correction computing unit 315 computes a total load PTc under the assumption of stoppage of the body, based on the speed of the body detected by the vehicle speed detector 23 and the total load PTb computed by the inclination-dependent, total load correction computing unit 314.

The divider 316 computes the front/rear load ratio XTa of the front load PF to the rear load PR by dividing the front load PF applied to the front suspension cylinders 18Al, 18Ar as computed by the adder 312A with the rear load PR applied to the rear suspension cylinders 18Bl, 18Br as computed by the adder 312B. Therefore, the divider 316 functions as a front/rear load ratio computing unit, which computes the front/rear load ratio XTa from the ratio of the front load PF acquired by the front load acquisition unit to the rear load PR acquired by the rear load acquisition unit.

The inclination-dependent, front/rear load ratio correction computing unit 317 computes a front/rear load ratio XTb under the assumption of no body inclination by correcting the front/rear load ratio XTa, which has been computed by the divider 316, based on the inclination θ detected by the inclination sensor 22 and the inclination-dependent correction characteristics B stored beforehand. The speed-dependent, front/rear load ratio correction computing unit 318 computes a front/rear load ratio XTc under the assumption of stoppage of the body based on the speed of the body detected by the vehicle speed detector 23 and the front/rear load ratio XTb computed by the inclination-dependent, front/rear load ratio correction computing unit 317.

The eccentric-loading-dependent, correction ratio computing unit 319 computes the eccentric-loading-dependent correction ratio Xa for the total load PTa by applying the front/rear load ratio XTc, which has been computed by the speed-dependent, front/rear load ratio correction computing unit 318, to the correlations of the eccentric-loading-dependent correction characteristics C stored beforehand. Therefore, the eccentric-loading-dependent, correction ratio computing unit 319 functions as a correction ratio computing unit.

In the first embodiment of the present invention, the cargo load computing device 31 includes a surface resistance detection unit 320 and a total load correction unit 321. The surface resistance detection unit 320 detects the surface resistance R of a travel road for the dump truck 1, and the total load correction unit 321 corrects the total load PTa, which is acting on the suspension cylinders 18Al, 18Ar, 18Bl, 18Br and has been computed by the adder 313, according to the surface resistance R detected by the surface resistance detection unit 320.

The surface resistance detection unit 320 computes the slip ratio of the dump truck 1, for example, based on the rotational speeds of the front wheels 12Al, 12Ar detected by the front-wheel rotational speed sensors 23Al, 23Ar and the rotational speeds of the rear wheels 12Bl, 12Br detected by the rear-wheel rotational speed sensors 24Bl, 24Br, calculates the surface friction coefficient, and detects the surface resistance R by using the surface friction coefficient.

Specifically, the surface resistance detection unit 320 can determine the slip ratio by introducing, for example, the rotational speeds of the front wheels 12Al, 12Ar and the rotational speeds of the rear wheels 12Bl, 12Br, which have been detected by the front-wheel rotational speed sensors 23Al, 23Ar and the rear-wheel rotational speed sensors 24Bl, 24Br, respectively, into the below-described equation (1). It is to be noted that in the following equation (1), a detection value of one of the front-wheel rotational speed sensors 23Al, 23Ar may be used as the rotational speed of the driven wheel and a detection value of one of the rear-wheel rotational speed sensors 24Bl, 24Br may be used as the rotational speed of the drive wheel.

$$\text{Slip ratio} = \{(\text{rotational speed of drive wheel}) - (\text{rotational speed of driven wheel})\} / (\text{rotational speed of drive wheel}) \quad (1)$$

Next, the surface resistance detection unit 320 computes the surface friction coefficient based on the slip ratio computed as described above and the surface friction characteristics F stored beforehand. The surface resistance detection unit 320 can also determine the surface resistance R by introducing, for example, the computed surface friction coefficient and the load on the suspension cylinders 18Al, 18Ar, 18Bl, 18Br, which has been computed by the respective multipliers 311Al, 311Ar, 311Bl, 311Br, into the below-described equation (2). It is to be noted that the computation results at one of the multipliers 311Al, 311Ar, 311Bl, 311Br can be used as the load on the suspension cylinder in the following equation (2).

$$\text{Surface resistance} = (\text{surface friction coefficient}) \times (\text{load on the suspension cylinder}) \quad (2)$$

The total load correction unit 321 includes a total load correction coefficient computing unit 321A, a multiplier 321B, a front/rear load ratio correction coefficient computing unit 321C, a multiplier 321D, a divider 321E, and a subtractor 321F.

The total load correction coefficient computing unit 321A computes the total load correction coefficient Ka by applying the surface resistance R, which has been detected by the surface resistance detection unit 320, to the surface-resistance-dependent correction characteristics D stored beforehand. In the first embodiment of the present invention, the correlations between the surface resistance R and the total load correction coefficient Ka in the surface-resistance-dependent correction characteristics D are set so that the total load correction coefficient Ka becomes 1, for example, when the surface resistance R is smaller than a predetermined threshold Ra.

The multiplier 321B computes a total load PTd under the assumption of eliminated effects of the surface resistance R by multiplying the total load PTc computed by the speed-dependent, total load correction computing unit 315 and the total load correction coefficient Ka computed by the total load correction coefficient computing unit 321A. Therefore, the multiplier 321B functions as a total load correction coefficient multiplier.

The front/rear load ratio correction coefficient computing unit 321C computes the front/rear load ratio correction coefficient Kb by applying the surface resistance R, which has been detected by the surface resistance detection unit 320, to the surface-resistance-dependent correction characteristics E stored beforehand. In the first embodiment of the present invention, the correlations between the surface resistance R and the front/rear load ratio correction coefficient Kb in the surface-resistance-dependent correction characteristics E are set so that the front/rear load ratio correction coefficient Kb becomes 1, for example, when the surface resistance R is smaller than the predetermined threshold Ra as in the above-mentioned surface-resistance-dependent correction characteristics D.

The multiplier 321D computes an eccentric-loading-dependent correction ratio Y under the assumption of eliminated effects of the surface resistance R by multiplying the eccentric-loading-dependent correction ratio Xa for the total load PTa as computed by the eccentric-loading-dependent, correction ratio computing unit 319 and the front/rear load ratio correction coefficient Kb computed by the front/rear load ratio correction coefficient computing unit 321C. Therefore, the multiplier 321D functions as a front/rear load ratio correction coefficient multiplier.

The divider 321E divides the total load PTd, which has been computed by the multiplier 321B, with the eccentric-loading-dependent correction ratio Y computed by the multiplier 321D, thereby computing a total load PT in which correction of errors caused by the inclination of the body, the eccentricity of the cargo 14A on the vessel 14 and the surface resistance R has been made. The subtractor 321F computes the load W of the cargo 14A carried on the vessel 14 by subtracting the body-side load G, which is supported by the front suspension cylinders 18Al, 18Ar and rear suspension cylinders 18Bl, 18Br, from the total load PT computed by the divider 321E.

On the other hand, the final cargo load confirmation device 33 includes a fluctuation width measuring unit 331, a minimum fluctuation width confirmation unit 332, a speed difference computing unit 333, and a final cargo load output unit 334.

The fluctuation width measuring unit 331 performs sampling measurement of load W of the cargo 14A, which has been computed by the cargo load computing device 31, several times within a predetermined time. The minimum fluctuation width confirmation unit 332 computes an average value of the plural measurement values obtained from the fluctuation width measuring unit 331, and confirms whether the difference between a maximum measurement value and a minimum measurement value has become minimum relative to the average value, in other words, whether the load W of the cargo 14A falls within a minimum fluctuation width. The speed difference computing unit 333 computes the difference between the rotational speed of the left rear wheels 12Bl detected by the rear-wheel rotational speed sensor 24Bl and the rotational speed of the right rear wheels 12Br detected by the rear-wheel rotational speed sensor 24Br.

The final cargo load output unit 334 outputs the load W of the cargo 14A, which has been computed by the cargo load computing device 31, as a load of the final cargo 14A to the display device 26 upon satisfaction of the conditions that the speed of the body detected by the vehicle speed detector 23 has reached a preset value (for example, several kilometers per hour) or higher, specifically the dump truck 1 is in a load-measurable traveling state (Condition 1), the load W of the cargo 14A has been confirmed to fall within the minimum fluctuation width by the minimum fluctuation width confirmation unit 332 (Condition 2), and the difference in rotational speed between the rear wheels 12Bl and 12Br computed by the speed difference computing unit 333 is smaller than a preset value, specifically the dump truck 1 can be determined to be traveling on a rectilinear travel road rather than a curvilinear travel road (Condition 3).

On the other hand, if any of the conditions that the dump truck 1 is in a load-measurable traveling state (Condition 1), the load W of the cargo 14A has been confirmed to fall within the minimum fluctuation width by the minimum fluctuation width confirmation unit 332 (Condition 2), and the dump truck 1 can be determined to be traveling on a rectilinear travel road rather than a curvilinear travel road (Condition 3), is not satisfied, the final cargo load output unit 334 disables the load W of the cargo 14A, which has been computed by the cargo load computing device 31, as an output of the load of the final cargo 14A.

The measurement processing of the load W of the cargo 14A by the load measuring apparatus 2 according to the first embodiment of the present invention will next be described in detail on the basis of a flow chart of FIG. 5.

Figure 5:
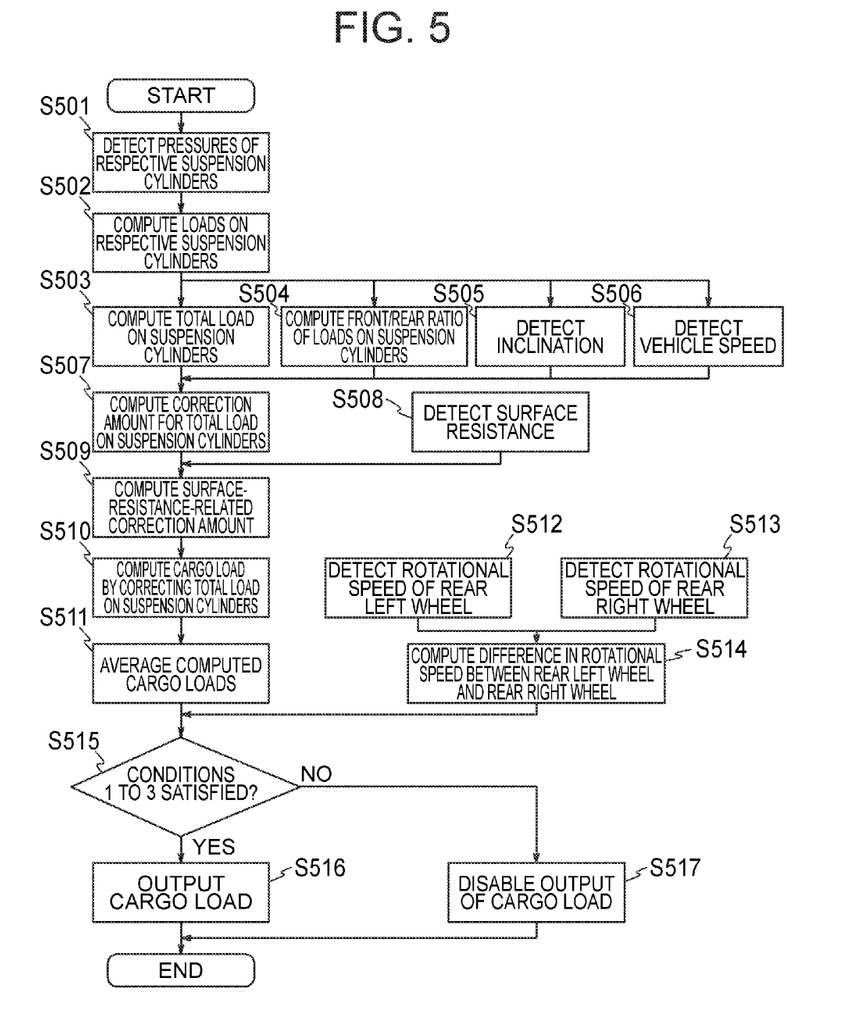
FIG. 5 is a flow chart illustrating the flow of measuring processing of the load of a cargo by the load measuring apparatus according to the first embodiment of the present invention.

As illustrated in FIG. 5, the cargo load computing device 31 receives detection values of the respective suspension pressure sensors 21Al, 21Ar, 21Bl, 21Br (step (hereinafter abbreviated as "S") 501).

Next, the respective multipliers 311Al, 311Ar of the cargo load computing device 31 compute loads, which are acting on the front suspension cylinders 18Al, 18Ar, by multiplying the suspension pressures of the front suspension cylinders 18Al, 18Ar as detected by the suspension pressure sensors 21Al, 21Ar and received in S501 and the cylinder cross-sectional area DA stored beforehand (S502).

Further, the respective multipliers 311Bl, 311Br of the cargo load computing device 31 compute loads, which are acting on the rear suspension cylinders 18Bl, 18Br, respectively, by multiplying the suspension pressures of the rear suspension cylinders 18Bl, 18Br as received in step S501 and detected by the suspension pressure sensors 21Bl, 21Br and the cylinder cross-sectional area DA stored beforehand (S502).

Next, the adder 312A of the cargo load computing device 31 computes a front load PF, which is acting on the front suspension cylinders 18Al, 18Ar, by adding the loads on the front suspension cylinders 18Al, 18Ar computed by the respective multipliers 311Al, 311Ar. Further, the adder 312B of the cargo load computing device 31 computes a rear load PR, which is acting on the rear suspension cylinders 18Bl, 18Br, by adding the loads on the rear suspension cylinders 18Bl, 18Br computed by the respective multipliers 311Bl, 311Br.

Then, the adder 313 of the cargo load computing device 31 computes a total load PTa, which is acting on the front suspension cylinders 18Al, 18Ar and rear suspension cylinders 18Bl, 18Br, by adding the front load PF computed by the adder 312A and the rear load PR computed by the adder 312B (S503). Further, the divider 316 computes the front/rear load ratio XTa of the front load PF computed by the adder 312A to the rear load PR computed by the adder 312B (S504). Furthermore, the cargo load computing device 31 receives a detection value of the inclination sensor 22 (S505), and also receives a detection value of the vehicle speed detector 23 (S506).

Next, the inclination-dependent, total load correction computing unit 314 of the cargo load computing device 31 computes a total load PTb under the assumption of no body inclination by correcting the total load PTa, which has been computed by the adder 313, based on the inclination θ detected by the inclination sensor 22 and the inclination-dependent correction characteristics A stored beforehand (S507). Further, the speed-dependent, total load correction computing unit 315 of the cargo load computing device 31 computes a total load PTc under the assumption of stoppage of the body based on the speed of the body detected by the vehicle speed detector 23 and the total load PTb computed by the inclination-dependent, total load correction computing unit 314 (S507).

The inclination-dependent, front/rear load ratio correction computing unit 317 of the cargo load computing device 31 computes a front/rear load ratio XTb under the assumption of no body inclination by correcting the front/rear load ratio XTa, which has been computed by the divider 316, based on the inclination θ detected by the inclination sensor 22 and the inclination-dependent correction characteristics B stored beforehand (S507). Further, the speed-dependent, front/rear load ratio correction computing unit 318 computes a front/rear load ratio XTc under the assumption of stoppage of the body based on the speed of the body detected by the vehicle speed detector 23 and the front/rear load ratio XTb computed by the inclination-dependent, front/rear load ratio correction computing unit 317. Subsequently, the eccentric-loading-dependent, correction ratio computing unit 319 computes an eccentric-loading-dependent correction ratio Xa for the total load PTa based on the front/rear load ratio XTc computed by the speed-dependent, front/rear load ratio correction computing unit 318 and the eccentric-loading-dependent correction characteristics C stored beforehand (S507).

Next, the cargo load computing device 31 receives detection values of the front-wheel rotational speed sensors 23Al, 23Ar and rear-wheel rotational speed sensors 24Bl, 24Br. Then, the surface resistance detection unit 320 of the cargo load computing device 31 computes a slip ratio of the dump truck 1 based on the rotational speeds of the front wheels 12Al, 12Ar detected by the front-wheel rotational speed sensors 23Al, 23Ar and the rotational speeds of the rear wheels 12Bl, 12Br detected by the rear-wheel rotational speed sensors 24Bl, 24Br, calculates a surface friction coefficient, and detects a surface resistance R by using the surface friction coefficient (S508).

Next, the total load correction coefficient computing unit 321A of the cargo load computing device 31 computes a total load correction coefficient Ka based on the surface resistance R detected by the surface resistance detection unit 320 in S508 and the surface-resistance-dependent correction characteristics D stored beforehand (S509). Further, the multiplier 321B of the cargo load computing device 31 computes a total load PTd under the assumption of eliminated effects of the surface resistance R by multiplying the total load PTc computed by the speed-dependent, total load correction computing unit 315 in S507 and the total load correction coefficient Ka computed by the total load correction coefficient computing unit 321A (S509).

The front/rear load ratio correction coefficient computing unit 321C of the cargo load computing device 31 computes a front/rear load ratio correction coefficient Kb based on the surface resistance R detected by the surface resistance detection unit 320 in S508 and the surface-resistance-dependent correction characteristics E stored beforehand (S509). Further, the multiplier 321D of the cargo load computing device 31 computes an eccentric-loading-dependent correction ratio Y under the assumption of eliminated effects of the surface resistance R by multiplying the eccentric-loading-dependent correction ratio Xa for the total load PTa as computed by the eccentric-loading-dependent, correction ratio computing unit 319 and the front/rear load ratio correction coefficient Kb computed by the front/rear load ratio correction coefficient computing unit 321C (S509).

Next, the divider 321E of the cargo load computing device 31 computes a total load PT on the suspension cylinders 18Al, 18Ar, 18Bl, 18Br by dividing the total load PTd computed by the multiplier 321B in S509 with the eccentric-loading-dependent correction ratio Y computed by the multiplier 321D in S509. In other words, the cargo load computing device 31 performs correction of errors, which have been caused by the inclination of the body, the eccentricity of the cargo 14A on the vessel 14 and the surface resistance R, on the total load PTa on the front suspension cylinders 18Al, 18Ar and rear suspension cylinders 18Bl, 18Br computed by the adder 313 in S503 (S510). Then, the subtractor 321F of the cargo load computing device 31 computes the load W of the cargo 14A carried on the vessel 14 by subtracting the body-side load G, which is supported by the front suspension cylinders 18Al, 18Ar and rear suspension cylinders 18Bl, 18Br, from the total load PT computed by the divider 321E (S510).

Then, the fluctuation width measuring unit 331 of the final cargo load confirmation device 33 performs sampling measurement of the load W of the cargo 14A, which has been computed by the subtractor 321F in S510, several times within the predetermined time. Further, the minimum fluctuation width confirmation unit 332 of the final cargo load confirmation device 33 averages plural pieces of data of the load W measured by the fluctuation width measuring unit 331, and confirms whether the load W of the cargo 14A falls within a minimum fluctuation width (S511).

Further, the final cargo load confirmation device 33 receives detection values of the rear-wheel rotational speed sensors 24Bl, 24Br (S512, S513). Then, the speed difference computing unit 333 of the final cargo load confirmation device 33 computes the difference between the rotational speed of the left rear wheels 12Bl detected by the rear-wheel rotational speed sensor 24Bl and the rotational speed of the right rear wheels 12Br detected by the rear-wheel rotational speed sensor 24Br (S514).

Next, the final cargo load output unit 334 of the final cargo load confirmation device 33 determines the satisfaction or dissatisfaction of the conditions that the speed of the body detected by the vehicle speed detector 23 in S506 has reached the preset value or higher (Condition 1), the load W of the cargo 14A has been confirmed to fall within the minimum fluctuation width by the minimum fluctuation width confirmation unit 332 in S511 (Condition 2), and the difference in rotational speed between the rear wheels 12Bl and 12Br computed by the speed difference computing unit 333 in S514 is smaller than the preset value (Condition 3)(S515).

Here, if the above-mentioned Conditions 1 to 3 are determined to be all satisfied (S515/YES), the final cargo load output unit 334 outputs the load W of the cargo 14A, which has been computed by the subtractor 321F in S510, as the load of the final cargo 14A to the display device 26 (S516), and the measuring processing of the load W of the cargo 14A by the load measuring apparatus 2 is ended. If any of the above-mentioned Conditions 1 to 3 is determined not to be satisfied in S515 (S515/NO), on the other hand, the final cargo load output unit 334 disables the load W of the cargo 14A, which has been computed by the subtractor 321F, as an output of the load of the final cargo 14A (S517), and the measuring processing of the load W of the cargo 14A by the load measuring apparatus 2 is ended.

According to the load measuring apparatus 2 of the first embodiment of the present invention configured as described above, the total load correction unit 321 of the cargo load computing device 31 corrects the total load PTa, which is acting on the suspension cylinders 18Al, 18Ar, 18Bl, 18Br and has been computed by the adder 313, according to the surface resistance R detected by the surface resistance detection unit 320, whereby effects of a measurement error of the load W of the cargo 14A caused by the surface resistance R of the travel road for the dump truck 1 can be reduced. As a consequence, it is possible to make an improvement in the accuracy of measurement of the load W of the cargo 14A by the load measuring apparatus 2.

In the load measuring apparatus 2 according to the first embodiment of the present invention, the total load correction unit 321 is configured to perform correction, which eliminates the effects of the surface resistance R, on the total load PTa acting on the suspension cylinders 18Al, 18Ar, 18Bl, 18Br and the eccentric-loading-dependent correction ratio Xa for the total load PTa, respectively. After performing the two-stage correction of the errors caused by the surface resistance R as described above, the total load correction unit 321 performs correction of errors caused by the inclination of the body and the eccentricity of the cargo 14A on the vessel 14, whereby the accuracy of measurement of the load W of the cargo 14A can be effectively improved.

In the load measuring apparatus 2 according to the first embodiment of the present invention, the correlations between the surface resistance R and the total load correction coefficient Ka in the surface-resistance-dependent correction characteristics D stored beforehand are set so that the total load correction coefficient Ka becomes 1 when the surface resistance R is smaller than the threshold Ra, and the correlations between the surface resistance R and the front/rear load ratio correction coefficient Kb in the surface-resistance-dependent correction characteristics E stored beforehand are set so that the front/rear load ratio correction coefficient Kb becomes 1 when the surface resistance R is smaller than the threshold Ra. If the effects on the measurement of the load W of the cargo 14A in association with the surface resistance R are small as in the case where the surface resistance R detected by the surface resistance detection unit 320 is smaller than the preset threshold Ra, the total load correction unit 321 can perform processing so that the total load PTa on the suspension cylinders 18Al, 18Ar, 18Bl, 18Br is not corrected substantially. As a consequence, the measurement of the load W of the cargo 14A by the load measuring apparatus 2 can be smoothly performed, and therefore the measurement processing of the load W of the cargo 14A can be performed faster.

[Second Embodiment]

Figure 6:
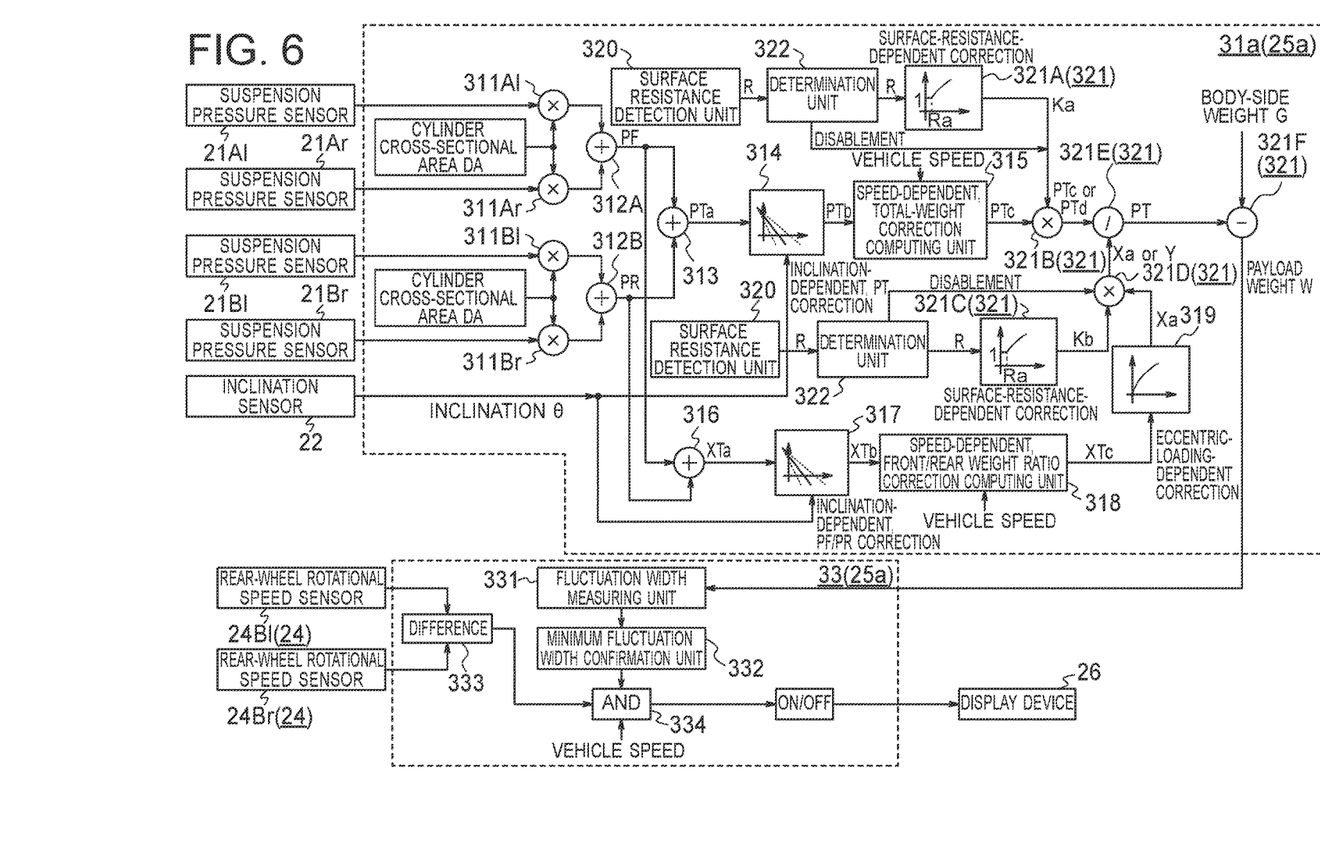
FIG. 6 is a functional block diagram illustrating main functions of a controller in a load measuring apparatus according to a second embodiment of the present invention.

A load measuring apparatus 2 according to a second embodiment of the present invention is provided, in addition to the above-described configurations of the load measuring apparatus 2 according to the first embodiment of the present invention, with a determination unit 322 that, as illustrated byway of example in FIG. 6, determines whether a cargo load computing device 31a of a controller 25a can detect a surface resistance R based on a detection signal from the surface resistance detection unit 320. The total load correction unit 321 is configured to disable the correction of the total load PTa on the suspension cylinders 18Al, 18Ar, 18Bl, 18Br computed by the adder 313 when the surface resistance R has been determined by the determination unit 322 not to be detectable.

Specifically, the determination unit 322 determines that the surface resistance R is detectable, for example, when a detection signal of the surface resistance detection unit 320 has been inputted within a predetermined time after initiation of measurement of the load W of the cargo 14A on the vessel 14. On the other hand, the determination unit 322 determines that the surface resistance R is not detectable, in other words, the surface resistance R is unknown or cannot be calculated, for example, when no detection signal of the surface resistance detection unit 320 has been inputted within the predetermined time after initiation of measurement of the load W of the cargo 14A for a reason such as cutoff of communications between the controller 25a and the front-wheel rotational speed sensors 23Al, 23Ar and rear-wheel rotational speed sensors 24Bl, 24Br.

In the second embodiment of the present invention, the multiplier 321B of the total load correction unit 321 outputs the total load PTc, as it is, to the divider 321E without performing the multiplication of the total load PTc and the total load correction coefficient Ka if the surface resistance R has been determined by the determination unit 322 not to be detectable. The multiplier 321D of the total load correction unit 321 outputs the eccentric-loading-dependent correction ratio Xa, as it is, to the divider 321E without performing the multiplication of the eccentric-loading-dependent correction ratio Xa for the total load PTa and the front/rear load ratio correction coefficient Kb if the surface resistance R has been determined by the determination unit 322 not to be detectable. It is to be noted that the remaining configurations of the second embodiment are similar to those of the above-mentioned first embodiment, the same or corresponding elements as in the first embodiment are designated by the same signs, and their overlapping description is omitted.

According to the load measuring apparatus 2 of the second embodiment of the present invention configured as described above, similar advantageous effects as in the above-mentioned first embodiment can be obtained. Further, the correction of the total load PTa on the suspension cylinders 18Al, 18Ar, 18Bl, 18Br by the total load correction unit 321 is disabled even if the surface resistance R is unknown or is not calculated due to the occurrence of a trouble in the communication environments or the like between the controller 25a and external equipment. It is, therefore, possible to prevent a value, which is a wrong value as a measurement value of the load W of the cargo 14A, from being outputted to the display device 26. As a consequence, superb reliability can be obtained on the measurement of the load W of the cargo 14A by the load measuring apparatus 2.

[Third Embodiment]

A third embodiment of the present invention is different from the above-mentioned first embodiment in that, although in the first embodiment, the surface-resistance-dependent correction characteristics D stored beforehand in the controller 25 are set so that the total load correction coefficient Ka becomes 1 when the surface resistance R is smaller than the preset threshold Ra and the surface-resistance-dependent correction characteristics E are set so that the front/rear load ratio correction coefficient Kb becomes 1 when the surface resistance R is smaller than the preset threshold Ra, the total load correction unit 321 in the third embodiment is configured, instead of such setting as described above, to disable the correction of the total load PTa on the suspension cylinders 18Al, 18Ar, 18Bl, 18Br computed by the adder 313 when the surface resistance R detected by the surface resistance detection unit 320 is smaller than the preset threshold Ra. It is to be noted that the remaining configurations of the third embodiment are similar to those of the above-mentioned first embodiment, the same or corresponding elements as in the first embodiment are designated by the same signs, and their overlapping description is omitted.

The measurement processing of the load W of the cargo 14A by the load measuring apparatus 2 according to the third embodiment of the present invention will hereinafter be described in detail on the basis of a flow chart of FIG. 7. It is to be noted that processing of S501 to S517 illustrated in FIG. 7 is the same as the above-mentioned processing of S501 to S517 illustrated in FIG. 5, its overlapping description is omitted, and only different processing will be described.

Figure 7:
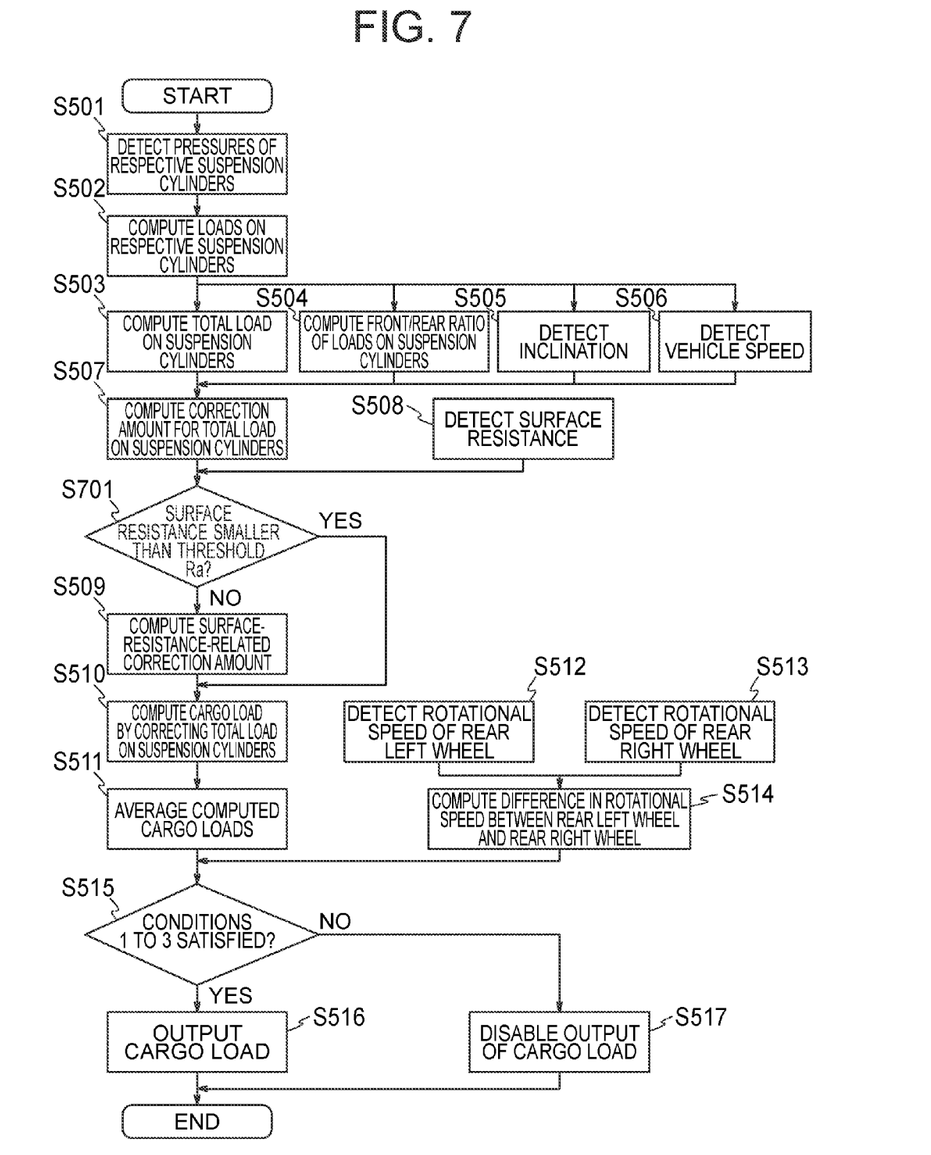
FIG. 7 is a flow chart illustrating the flow of measuring processing of the load of a cargo by a load measuring apparatus according to a third embodiment of the present invention.

As illustrated in FIG. 7, after the processing of S507 and S508 has been performed, the total load correction unit 321 determines if the surface resistance R detected by the surface resistance detection unit 320 in S508 is smaller than the threshold Ra (S701).

If the surface resistance R detected by the surface resistance detection unit 320 is determined to be smaller than the threshold Ra here (S701/YES), the total load correction unit 321 performs correction of errors, which have been caused by the inclination of the body and the eccentricity of the cargo 14A on the vessel 14, on the total load PTa on the suspension cylinders 18Al, 18Ar, 18Bl, 18Br in S510 without performing correction of an error caused by the surface resistance R, and then performs processing from S511.

If the surface resistance R detected by the surface resistance detection unit 320 is determined to be the threshold Ra or greater (S701/NO), the total load correction unit 321 performs processing from S509. In this case, processing similar to the above-mentioned first embodiment will be performed.

According to the load measuring apparatus 2 of the third embodiment of the present invention configured as described above, similar advantageous effects as in the above-mentioned first embodiment can be obtained. Further, when the effects on the measurement of the load W of the cargo 14A in association with the surface resistance R are small as in when the surface resistance R detected by the surface resistance detection unit 320 is smaller than the preset threshold Ra, the total load correction unit 321 can perform processing to disable the correction of the total load PTa on the suspension cylinders 18Al, 18Ar, 18Bl, 18Br even if neither the computation of the total load correction coefficient Ka by the total load correction coefficient computing unit 321A nor the computation of the front/rear load ratio correction coefficient Kb by the front/rear load ratio correction coefficient computing unit 321C is performed. As a consequence, the correction of the total load PTa on the suspension cylinders 18Al, 18Ar, 18Bl, 18Br can be provided with improved freedom so as to improve in service for an operator riding in the operator's cab 13 of the dump truck 1.

The above-mentioned embodiments are described in detail to facilitate the understanding of the present invention, and therefore the present invention shall by no means be limited to those provided with all the configurations. Further, a part or parts of the configurations of one of the embodiments can be substituted for the corresponding configuration or configurations of one or more of the remaining embodiments, and a part or parts of the configurations of one of the embodiments can be added the configurations of one or more of the remaining embodiments.

In the load measuring apparatus 2 according to the first embodiment of the present invention, the description is made about the case where the surface resistance detection unit 320 computes the surface friction coefficient from the slip ratio of the dump truck 1 and determines the surface resistance R of the travel road for the dump truck 1 by using the surface friction coefficient and the results of computation by one of the multipliers 311Al, 311Ar, 311Bl, 311Br. The present invention is, however, not limited to such a case. For example, drive torque detectors (not illustrated) may be arranged to detect a drive torque to be applied to the rear wheels 12Bl, 12Br, an acceleration of the body may be calculated from a speed of the body detected by the vehicle speed detector 23, and the surface resistance R may then be determined based on the acceleration of the body and the drive torque detected by the drive torque detector. As a further alternative, the surface resistance R may be determined using an element or the like other than those mentioned above.

Further, in the load measuring apparatus 2 according to the first embodiment of the present invention, the description is made about the case where the correlations between the surface resistance R and the total load correction coefficient Ka in the surface-resistance-dependent correction characteristics D stored beforehand in the controller 25 are set so that the total load correction coefficient Ka becomes 1 when the surface resistance R is smaller than the predetermined threshold Ra. The present invention is, however, not limited to such a case. For example, the correlations between the surface resistance R and the total load correction coefficient Ka in the surface-resistance-dependent correction characteristics D may be set as an increasing function of the total load correction coefficient Ka with the surface resistance R, and as a further alternative, may also be set as another function. This applies equally to the correlations between the surface resistance R and the front/rear load ratio correction coefficient Kb in the surface-resistance-dependent correction characteristics E.

LEGENDS

1 . . . dump truck (working machine), 2 . . . load measuring apparatus, 12 . . . wheel, 12Al, 12Ar . . . front wheel, 12Bl, 12Br . . . rear wheel, 14 . . . vessel, 14A . . . cargo, 18Al, 18Ar . . . front suspension cylinder, 18Bl, 18Br . . . rear suspension cylinder, 21Al, 21Ar . . . suspension pressure sensor (front load acquisition unit), 21Bl, 21Br . . . suspension pressure sensor (rear load acquisition unit), 22 . . . inclination sensor, 23 . . . vehicle speed detector, 23Al, 23Ar . . . front-wheel rotational speed sensor, 24 . . . drive-wheel rotational speed detector, 24Bl, 24Br . . . rear-wheel rotational speed sensor, 25, 25a . . . controller, 31, 31a . . . cargo load computing device, 33 . . . final cargo load confirmation device, 311Al, 311Ar . . . multiplier (front load acquisition unit), 311Bl, 311Br . . . multiplier (rear load acquisition unit), 312A . . . adder (front load acquisition unit), 312B . . . adder (rear load acquisition unit), 313 . . . adder (total load computing unit), 314 . . . inclination-dependent, total load correction computing unit, 315 . . . speed-dependent, total load correction computing unit, 316 . . . divider (front/rear load ratio computing unit), 317 . . . inclination-dependent, front/rear load ratio correction computing unit, 318 . . . speed-dependent, front/rear load ratio correction computing unit, 319 . . . eccentric-loading-dependent, correction ratio computing unit (correction ratio computing unit), 320 . . . surface resistance detection unit, 321 . . . total load correction unit, 321A . . . total load correction coefficient computing unit, 321B . . . multiplier (total load correction coefficient multiplier), 321C . . . front/rear load ratio correction coefficient computing unit, 321D . . . multiplier(front/rear load ratio correction coefficient multiplier), 321E . . . divider, 321F . . . subtractor, 322 . . . determination unit.

The invention claimed is:

1. A load measuring apparatus for a working machine applicable to a working machine having a body frame, front wheels and rear wheels rotatably disposed on the body frame, a vessel tiltably mounted on the body frame for carrying a cargo, and front suspension cylinders and rear suspension cylinders disposed between the body frame and the front wheels and rear wheels, respectively, for reducing shocks to a body during traveling, to measure a load of the cargo carried on the vessel, wherein the front suspension cylinders include a left front suspension cylinder and a right front suspension cylinder, the rear suspension cylinders include a left rear suspension cylinder and a right rear suspension cylinder, the load measuring apparatus for a working machine comprising:

a front-wheel rotational speed sensor that detects rotational speed of the front wheels;

a rear-wheel rotational speed sensor that detects rotational speed of the rear wheels;

a front load acquisition unit that acquires a front load applied to the front suspension cylinders;

a rear load acquisition unit that acquires a rear load applied to the rear suspension cylinders;

a surface resistance detection unit that detects a surface resistance of a travel road for the working machine;

a total load computing unit that based on the front load acquired by the front load acquisition unit and the rear load acquired by the rear load acquisition unit, computes a total load acting on the front suspension cylinders and rear suspension cylinders to determine the load of the cargo;

a computed total load value correction unit that corrects the total load computed by the total load computing unit, according to the surface resistance detected by the surface resistance detection unit so as to obtain a corrected total cargo load value;

a storage device that stores a first correlation between a front/rear load ratio as a ratio of the front load to the rear load and a total load eccentric-loading-dependent correction ratio for correcting an error caused by eccentricity of the cargo on the vessel, a second correlation between the surface resistance and a total load correction coefficient as a correction coefficient for correcting an error caused by the surface resistance on the total load, a third correlation between the surface resistance and a front/rear load ratio correction coefficient as a correction coefficient for correcting an error caused by the surface resistance on the front/rear load ratio, and a body-side load of the working machine, a cylinder cross-sectional area which is a cross-sectional area of each of the front suspension cylinders and the rear suspension cylinders, and surface friction characteristics;

a front/rear load ratio computing unit that computes the front/rear load ratio from a ratio of the front load acquired by the front load acquisition unit to the rear load acquired by the rear load acquisition unit; and a correction ratio computing unit that computes the total load eccentric-loading-dependent correction ratio by applying the front/rear load ratio computed by the front/rear load ratio computing unit, to the first correlation stored in the storage device, wherein the front load acquisition unit comprises:

a first multiplier that computes a left front side load acting on the left front suspension cylinder by multiplying a suspension pressure in the left front suspension cylinder by the cylinder cross sectional area, a second multiplier that computes a right front side load acting on the right front suspension cylinder by multiplying a suspension pressure in the right front suspension cylinder by the cylinder cross-sectional area, and a first adder that computes the front side load by adding the left front side load and the right front side load;

wherein the rear load acquisition unit comprises:

a third multiplier that computes a left rear side load acting on the left rear suspension cylinder by multiplying a suspension pressure in the left rear suspension cylinder by the cylinder cross sectional area, a fourth multiplier that computes a right rear side load acting on the right rear suspension cylinder by multiplying a suspension pressure in the right rear suspension cylinder by the cylinder cross sectional area, and a second adder that computes the rear side load by adding the left rear side load and the right side rear side load;

wherein the surface resistance detection unit computes a slip ratio by dividing a value obtained by subtracting the rotational speed of the front wheel detected by the front-wheel rotational speed sensors from the rotational speed of the rear wheel detected by the rear-wheel rotational speed sensors, by the rotational speed of the rear wheel;

computes a road surface friction coefficient on the basis of the computed slip ratio and a road surface friction characteristics, and obtains the surface resistance of the travel road by multiplying the computed road surface friction coefficient by any one of the left front load, the right front load, the left rear load, and the right rear load;

wherein the computed total load value correction unit includes:

a total load correction coefficient computing unit that computes the total load correction coefficient by applying the surface resistance, which has been detected by the surface resistance detection unit, to the second correlation stored in the storage device;

a total load correction coefficient multiplier that multiplies the total load correction coefficient, which has been computed by the total load correction coefficient computing unit, by the total load computed by the total load computing unit so as to obtain a surface resistance eliminated total load;

a front/rear load ratio correction coefficient computing unit that computes the front/rear load ratio correction coefficient by applying the surface resistance detected by the surface resistance detection unit, to the third correlation stored in the storage device;

a front/rear load ratio correction coefficient multiplier that multiplies the front/rear load ratio correction coefficient computed by the front/rear load ratio correction coefficient computing unit, by the total load eccentric-loading-dependent correction ratio computed by the correction ratio computing unit; so as to obtain a surface resistance eliminated eccentric-loading-dependent correction ratio;

a divider that computes an error corrected total load by dividing the surface resistance eliminated total load by the surface resistance eliminated eccentric-loading-dependent correction ratio; and a subtractor that computes the corrected cargo load value by subtracting the vehicle body-side load from the error corrected total load.

2. The load measuring apparatus for a working machine according to claim 1, further comprising:

a determination unit that based on a detection signal from the surface resistance detection unit, determines whether the surface resistance is detectable, wherein the computed total load value correction unit disables the correction of the total load computed by the total load computing unit when the surface resistance has been determined by the determination unit not to be detectable.

3. The load measuring apparatus for a working machine according to claim 1, wherein the second correlation stored in the storage device is set that the total load correction coefficient is 1 when the surface resistance is smaller than a predetermined threshold.

4. The load measuring apparatus for a working machine according to claim 1, wherein:

the computed total load value correction unit disables the correction of the total load computed by the total load computing unit, when the surface resistance detected by the surface resistance detection unit is smaller than a predetermined threshold.

* * * * *